UNITED STATES PATENT OFFICE.

JAMES ASTON, OF PITTSBURGH, PENNSYLVANIA, ASSIGNOR TO A. M. BYERS COMPANY, OF PITTSBURGH, PENNSYLVANIA, A CORPORATION OF PENNSYLVANIA.

METHOD OF MAKING WROUGHT IRON.

1,380,178.  Specification of Letters Patent.  Patented May 31, 1921.

No Drawing. Application filed February 4, 1920, Serial No. 356,309. Renewed September 7, 1920. Serial No. 408,773.

*To all whom it may concern:*

Be it known that I, JAMES ASTON, residing at Pittsburgh, Allegheny county, Pennsylvania, have invented a new and useful Improvement in Methods of Making Wrought-Iron, of which the following is a full, clear, and exact description.

My invention relates to a method of making wrought iron from the substantially slagless product produced by a steel-making furnace, such as a Bessemer or open-hearth furnace.

In my United States Reissue Letters Patent No. 14,457, granted April 2, 1918, I have described a process for this purpose in which finely divided steel is fed into a puddling bath. In that process, considerable time and heat are required to bring the finely divided steel up to welding temperature in the bath, and I have discovered that a considerable saving can be effected by preheating the comminuted or finely divided steel material before feeding it into the bath of puddling slag.

In accordance with my present invention, I take finely divided granulated or comminuted steel or the product of a steel-making operation in such granulated or finely divided form and preheat it, preferably in a reducing atmosphere, to a point below its welding temperature. This hot finely divided steel material is then fed, preferably gradually, into a bath of iron silicate slag which preferably is at or somewhat above the welding temperature. As the hot comminuted or granulated material enters the slag bath, its temperature will be raised to the welding temperature and a ball will be formed either as the material drops through the bath or by hand or mechanical puddling, if desired. The ball may then be removed from the puddling bath and squeezed and treated in the ordinary manner.

The advantages of my invention result from preheating the comminuted steel material prior to feeding it into a bath of puddling slag, since thereby the operation is made more rapid and less heat consumed, as the metal is preheated directly and while unprotected by a slag blanket.

The comminuted material may be made either by pouring the product of a steel furnace into water or in any other desired manner.

I claim:

1. In the manufacture of wrought iron, the steps consisting of preheating the comminuted or granulated product of a steel-making operation of substantially the same composition, feeding the preheated material into a bath of iron silicate slag, and forming a ball therein.

2. In the manufacture of wrought iron, the steps consisting of preheating the granulated or comminuted product of a steel-making operation of substantially the same composition to a temperature below its welding temperature, feeding it into a bath of puddling slag and raising its temperature, and forming a ball therein.

3. In the manufacture of wrought iron, the steps consisting of preheating the granulated or comminuted product of a steel-making operation of substantially the same composition to a temperature below its welding temperature, feeding it into a bath of puddling slag which is at or above a welding temperature, and forming a ball therein.

4. In the manufacture of wrought iron, the steps consisting of preheating granules of substantially the same composition and size and resulting from comminuting the product of a steel-making operation, feeding the preheated granules into a bath of puddling slag and forming a ball therein.

In testimony whereof, I have hereunto set my hand.

JAMES ASTON.